United States Patent [19]

Currie et al.

[11] 3,844,257
[45] Oct. 29, 1974

[54] ROTARY COMBUSTION ENGINE SPARK PLUG ARRANGEMENT

[75] Inventors: James H. Currie, Rochester; Edward A. Rishavy, Warren, both of Mich.

[73] Assignee: General Motors Corporation, Detroit, Mich.

[22] Filed: Aug. 17, 1973

[21] Appl. No.: 389,383

[52] U.S. Cl............................... 123/8.45, 123/8.09
[51] Int. Cl............................................ F02b 53/12
[58] Field of Search.................. 123/8.01, 8.09, 8.45

[56] References Cited
UNITED STATES PATENTS
3,464,395   9/1969   Kelly..................................... 123/8.45
3,766,893   10/1973  Tredway et al..................... 123/8.45

Primary Examiner—William L. Freeh
Assistant Examiner—Michael Koczo, Jr.
Attorney, Agent, or Firm—Ronald L. Phillips

[57] ABSTRACT

A rotary combustion engine having a rotor that planetates within a housing in a cavity defined by a pair of oppositely facing interior side walls and an interior peripheral wall and working chambers that are defined by these walls and the rotor and rotate with the rotor while varying in volume is provided with a spark plug whose electrode is open to a spark access hole through one of the side walls that is located such that as the rotor planetates the working chambers are periodically opened to this access hole past recessed edges on one side of the rotor and are prevented from being opened to adjacent chambers via this access hole by this one rotor side and also existing corner seals on this one rotor side.

2 Claims, 4 Drawing Figures

PATENTED OCT 29 1974  3,844,257
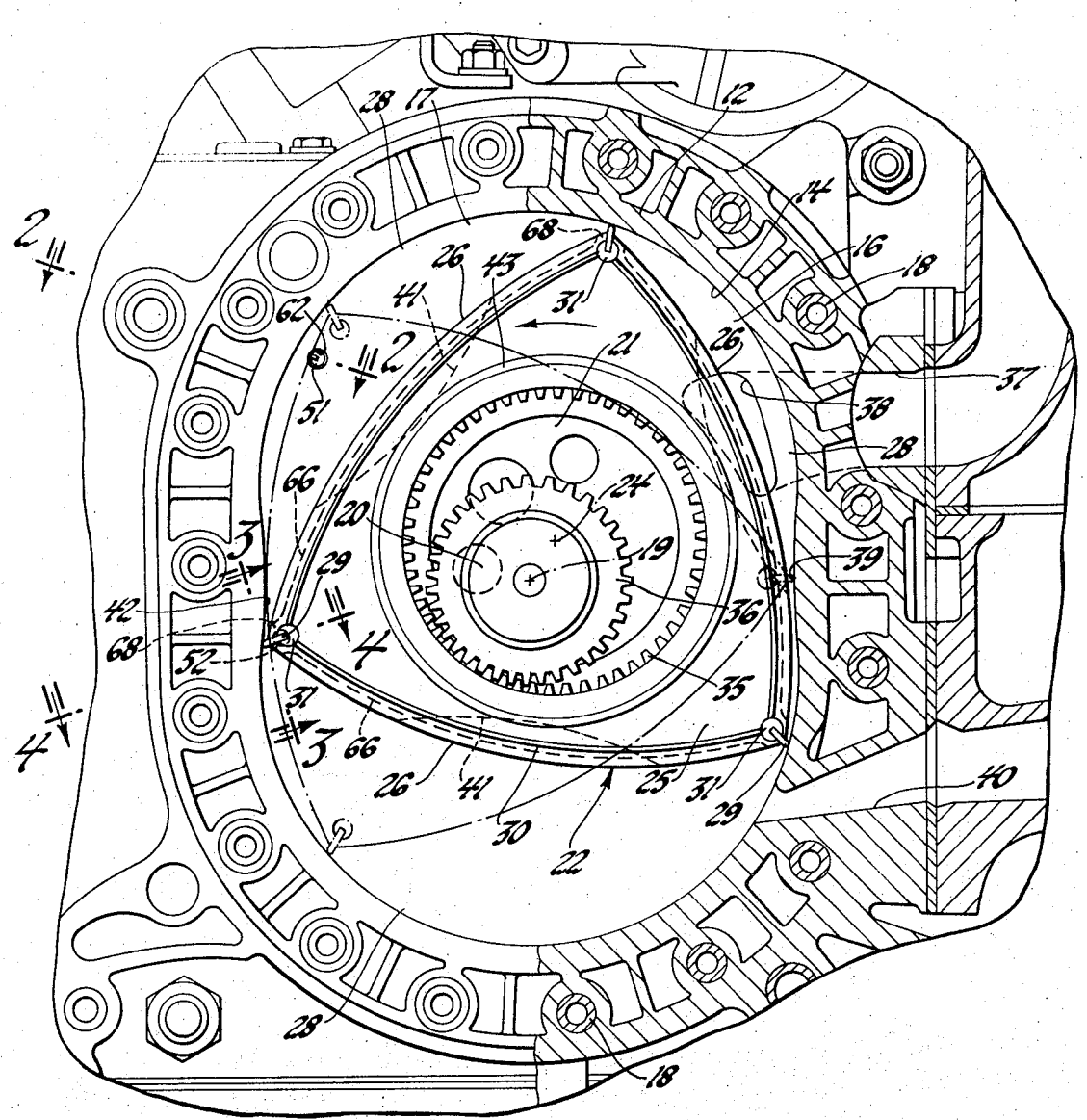
Fig. 1
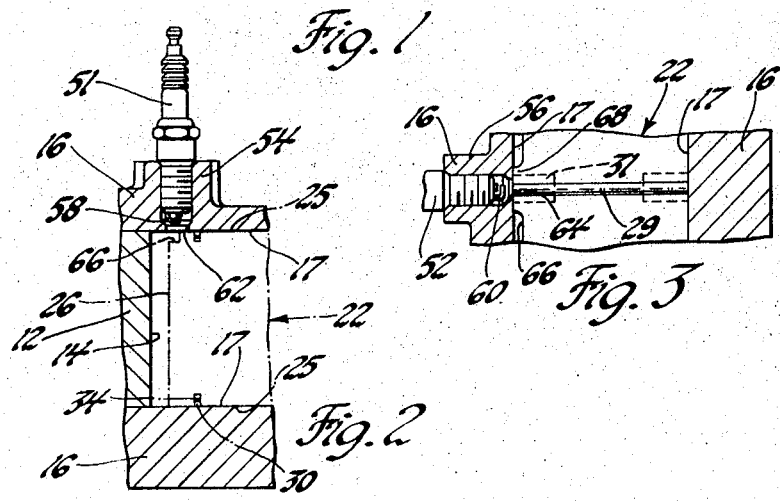
Fig. 2
Fig. 3
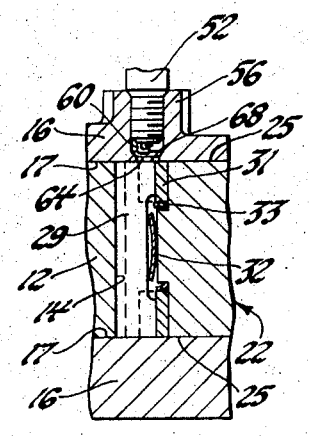
Fig. 4

ROTARY COMBUSTION ENGINE SPARK PLUG ARRANGEMENT

This invention relates to rotary combustion engine spark plug arrangements and more particularly to rotary combustion engine spark plug arrangements that do not allow gas leakage between the working chambers.

In the presently commercial rotary combustion engines, one or more spark plugs are mounted in the engine's rotor housing with each spark plug having its electrode open to a spark access hole in the rotor housing's internal peripheral wall with the result that the engine rotor's apex seals traverse such a spark access hole. Since these apex seals normally have line contact with the rotor housing's internal peripheral wall, the spark access hole during apex seal traverse provides a leak path between the two chambers on the opposite sides of this apex seal with the result there is gas blowby resulting in power loss. One previous solution has been to mount the sparkplug in one of the end housings and have its spark access hole closed by either the passing corner seal or the passing apex seal which are sized for this purpose such as disclosed in U.S. Pat. No. 3,766,893, issued Oct. 23, 1973 to Tredway et al.

According to the present invention, a spark plug is mounted in one of the end housings of a rotary combustion engine with its electrode open to a spark access hole that extends through this end housing's interior side wall and is located near the interior peripheral wall. The engine's working chambers which move with the rotor within the housing while varying in volume are sequentially periodically opened past recessed edges on one side of the rotor to the spark access hole. The spark access hole is prevented from providing a leak path between adjacent chambers as the rotor's corners traverse the spark access hole by cooperation between this one side of the rotor at the corners between the recessed edges and the existing corner seals in this one side of the rotor.

An object of the present invention is to provide a new and improved rotary combustion engine spark plug arrangement.

Another object is to provide in a rotary combustion engine a new and improved spark plug arrangement that does not provide a leak path between the engine's working chambers.

Another object is to provide in a rotary combustion engine a spark access hole in one of the engine housing's side walls that is completely covered by the engine rotor's corner seals and the opposing one side of the rotor at the rotor's corners as they pass thereby.

Another object is to provide in a rotary combustion engine a spark access hole for a spark plug located in one of the engine housing's interior side walls and close to the housing's interior peripheral wall so that the engine's working chambers are periodically opened past recessed edges on one side of the rotor to the spark access hole and wherein the spark access hole is prevented from providing connection between the engine's working chambers by this one side of the rotor at the corners cooperating with the rotor's corner seals on this one side.

These and other objects of the present invention will be more apparent from the following description and drawing in which:

FIG. 1 is a transverse view with parts broken away of a rotary combustion engine having two spark plug arrangements according to the present invention.

FIG. 2 is a view of one of the spark plug arrangements taken on the line 2—2 in FIG. 1.

FIG. 3 is a view of the other spark plug arrangement taken on the line 3—3 in FIG. 1.

FIG. 4 is a view of the other spark plug arrangement taken on line 4—4 in FIG. 1.

The spark plug arrangement according to the present invention is for use in a rotary combustion engine of present commercial type which as shown in the drawing comprises a rotor housing 12 having an interior inwardly facing peripheral wall 14 and end housings 16 having interior oppositely facing spaced side walls 17, the rotor housing 12 being secured between the end housings 16 by bolts 18. The peripheral wall 14 is in the shape of a two-lobed epitrochoid or a curve parallel thereto whose center is indicated at 19. A crankshaft 20 extends through the cavity thus formed and is rotatably supported by the end housings 16 so that the shaft axis is coincident with a line through the center 19 parallel to the peripheral wall 14.

The crankshaft 20 is provided in the cavity with an eccentric 21 on which a rotor 22 is mounted for rotation about the eccentric's center line 24 which is thus the rotor's axis. The rotor 22 has the general shape of a triangle with two sides 25 which face the side walls 17 and three faces 26 which are convex and face the peripheral wall 14 and cooperate therewith and with the side walls to define three variable volume working chambers 28. A one-piece apex seal 29 is mounted at each apex or corner of rotor 22 and extends the width thereof and three arcuate side seals 30 are mounted in grooves in each rotor side 25 and are arranged to extend adjacent the rotor faces between the apex seals 29 with three cylindrical corner seals 31 mounted in cylindrical blind bores in each rotor side 25 at the corners thereof providing sealing links between the ends of the side seals and the apex seals, each of the corner seals 31 having a radially outwardly facing slot receiving one end of one of the apex seals 29.

As shown in FIG. 4, each of the apex seals 29 is urged by a spring 32 to continuously engage the peripheral wall 14 and each of the corner seals 31 is urged by a spring 33 to continuously engage the opposed side wall 17. Each of the side seals 30 is urged by a spring 34 to also continuously engage the opposed side wall 17 as shown in FIG. 2 with the complete seal arrangement thus acting to effectively seal the chambers from one another.

With the two-lobed peripheral wall 14 and the three-corner rotor 22, each of the working chambers sequentially expands and contracts between minimum and maximum volume twice during each complete rotor revolution in fixed relation to the housing by forcing the rotor 22 to rotate at one-third the speed of the crankshaft 20 in a fixed relationship to the housing. This is accomplished by gearing comprising an internally toothed gear 35 which is concentric with and fixed to the rotor 22. The gear 35 meshes with an externally toothed annular gear 36 which is freely received about and is concentric with the crankshaft and is made stationary by being fixed to one of the end housings 16. The gear 35 has one and one-half times the number of teeth as the gear 36 to provide the required ratio of 3:1 between the crankshaft 20 and the rotor 22. An air-fuel mixture from a suitable carburetor arrangement, not shown, is made available to each working chamber 28 by an intake passage 37 that extends through the end housings 16 and opens to the cavity containing the rotor through oppositely facing intake ports 38, only one being shown, in the side walls 17 with this porting to the cavity being located to one side of the peripheral wall's cusp 39. The exhaust products of combustion are delivered from each chamber 28 by an exhaust port 40 which extends through the rotor housing 12 and opens through the peripheral wall 14 on the other side of cusp 39. A single channel or recess 41 is provided in the center of each chamber face 26 of the rotor 22 to provide for the transfer of working gases past the peripheral wall's other cusp 42 when a rotor face is at or near a top-dead-center position as shown by the phantom-line rotor position in FIG. 1 so that a chamber is not divided by cusp 42 at the time when combustion is occurring therein. A circular oil seal 43 concentric with and mounted on the rotor on each rotor side 25 radially inward of the side seals 30 seals against the side walls 17 to retain oil radially inward thereof.

The engine construction thus far described is conventional. Typically, such engines have each of the three working chambers undergoing intake, compression, expansion and exhaust to provide a power phase for each revolution of the crankshaft, there thus being provided from the three working chambers three power phases for every crankshaft revolution. As the rotor rotates in the direction of the arrow in FIG. 1, the working chambers 28 successively draw in the air-fuel mixture as the rotor sides 25 radially outward of the side seals 30 uncover the intake ports 38 in the side walls 17. The fuel mixture is then trapped in each working chamber and compressed and when the rotor face of this chamber is in the vicinity of top-dead-center, this mixture is ignited at the completion of the compression phase. It is present commercial practice to have either one or two spark plugs located in the rotor housing 12 with their spark access or shooter holes extending through the peripheral wall 14. In the case where only one spark plug is used, the single spark plug is normally located on the leading side of the cusp 42 which is generally opposite the exhaust opening to the rotor cavity and in the case of two spark plugs, they are located on the leading and trailing sides of this cusp. In either case, the spark is exposed to the passing working chambers 28 for ignition through a spark access hole in the peripheral wall 14. Upon ignition of the mixture in the working chambers, the peripheral wall takes the reaction forcing the rotor to continue rotation while the gas is expanding. The leading apex seal of each of the working chambers eventually traverses the exhaust port 40 and the exhaust products are then expelled to the atmosphere to complete the cycle.

Describing now the spark plug arrangement according to the present invention for use with the previously described engine structure at both leading and trailing locations, there are provided two spark plugs 51 and 52 which are threadably mounted in spark plug bosses 54 and 56, respectively, in one of the end housings 16. The spark plugs 51 and 52 have their electrodes 58 and 60 located in spark access holes 62 and 64, respectively, which open through this end housing's side wall 17. The spark plugs 51 and 52 and their respective spark access holes 62 and 64 are located on opposite sides of the peripheral wall's cusp 42 with the spark plug 52 and its spark access hole 64 leading the other spark plug 51 and its spark access hole 62. Each of the spark access holes 62 and 64 is located radially outward of the path of the conventionally located side seals 30 and thus very close to the peripheral wall 14 and partially in the path of the apex seals 29 and the corner seals 31 which are radially inward thereof and what would normally be the edges of the rotor faces 26. Each of the rotor edges on the spark plug side are provided with a recess 66 that extends sufficiently radially inwardly and peripherally therealong to fully expose the spark access holes 62 and 64 when the rotor is in position for voltage supply to the spark plugs 51 and 52 as shown by the phantom-line rotor position in FIG. 1. At this point it is important to recognize that presently commercial apex seals of one-piece design do not sealingly engage the side walls and do not have an end size that is sufficiently large enough to bridge the smallest practical size spark access hole as can be seen in FIG. 1 relative to spark access hole 64 and thus normal size one-piece apex seals could not serve to effectively cover such a hole during a traverse. Furthermore, conventional size corner seals are not normally large enough or in a position to effectively cover a spark access hole close to the peripheral wall. Instead of modifying existing corner seals and apex seals to close or assist in closing the spark access holes, the apex seals are permitted by the present invention to remain of conventional design by the provision at each rotor corner of a side wall area or portion 68 between adjacent ends of the recesses 66 that is sufficient in size to cooperate with the adjoining corner seal 31 to completely cover the spark access holes during traversing corner seal motion as shown by the solid-line rotor position in FIG. 1 in which spark access hole 64 is covered whereby there can be no blowby or communication between two chambers during the traversing of each spark access hole by the apex seal between these chambers.

Thus, the working chambers 28 are sequentially periodically opened by the rotor 22 on the one rotor side to the side wall located spark access holes 62 and 64 to allow the spark plugs 51 and 52 to ignite compressed intake mixture in the working chambers and these spark plug access holes are completely covered by cooperation between the corner seals 31 and the corner side wall portions 68 as the apex seals 29 pass by and are thus prevented from providing leak paths for gas blowby from one chamber to another chamber of lower pressure on the other side of the conventional size apex seals.

Recognizing that the maximum pressure differential between two chambers and thus across the apex seal therebetween is experienced on the trailing side of the combustion side cusp of the peripheral wall, the present spark plug arrangement which positively prevents gas blowby permits a wider selection of locations for the trailing spark plug for more complete burn as compared with a spark plug arrangement wherein the spark access hole is located in a compromise position that avoids the high pressure differential zone where the gas blowby power loss would be higher than the gain in better burn.

The above described embodiment is illustrative of the invention which may be modified within the scope of the appended claims.

We claim:

1. A rotary combustion engine comprising a rotor housing having an interior multi-lobed peripheral wall and a pair of end housings having oppositely facing interior side walls cooperatively defining a cavity, an output shaft rotatably mounted in said end housings having an eccentric located in said cavity, a multi-corner rotor rotatably mounted on said eccentric having sides opposite said side walls and a plurality of peripheral faces opposite said peripheral wall, said rotor faces and housing walls cooperating to provide a plurality of working chambers that are spaced about and move with said rotor within said rotor housing while varying in volume as said rotor planetates, gas seal means mounted on said rotor for sealingly contacting said housing walls to seal said working chambers from each other, said gas seal means including an apex seal mounted on each rotor apex with an outer edge sealingly contacting said peripheral wall and ends opposite said side walls and side seals mounted on each rotor side sealingly contacting the opposite side wall with each said side seal extending adjacent one of said rotor faces between two of said rotor corners and corner seals mounted on each rotor side at the corners thereof sealingly contacting the opposite side wall with each said corner seal sealingly joining one of said apex seals and two of said side seals, an intake port in one of said housing walls located so that said working chambers are sequentially periodically opened by said rotor past said gas seal means to said intake port as said rotor planetates, an exhaust port located in one of said housing walls so that said working chambers are sequentially periodically opened by said rotor past said gas seal means to said exhaust port as said rotor planetates, a spark plug spark access hole smaller in area than the ends of said corner seals located adjacent said peripheral wall in one of said side walls opposite one side of said rotor in a position so that as said rotor planetates said spark access hole is periodically opened to said working chambers by said rotor radially outward of said side seals and is also periodically traversed and completely closed by said one rotor side at the corners thereof cooperating with said corner seals on said one rotor side to thereby prevent leakage between adjacent working chambers through said spark access hole as said apex seals pass said spark access hole.

2. A rotary combustion engine comprising a rotor housing having an interior multi-lobed peripheral wall and a pair of end housings having oppositely facing interior side walls cooperatively defining a cavity, an output shaft rotatably mounted in said end housings having an eccentric located in said cavity, a multi-corner rotor rotatably mounted on said eccentric having sides opposite said side walls and a plurality of peripheral faces opposite said peripheral wall, said rotor faces and housing walls cooperating to provide a plurality of working chambers that are spaced about and move with said rotor within said rotor housing while varying in volume as said rotor planetates, gas seal means mounted on said rotor for sealingly contacting said housing walls to seal said working chambers from each other, said gas seal means including an apex seal mounted on each rotor apex with an outer edge sealingly contacting said peripheral wall and ends opposite said side walls and side seals mounted on each rotor side sealingly contacting the opposite side wall with each said side seal extending adjacent one of said rotor faces between two of said rotor corners and corner seals mounted on each rotor side at the corners thereof sealingly contacting the opposite side wall with each said corner seal sealingly joining one of said apex seals and two of said side seals, an intake port in one of said housing walls located so that said working chambers are sequentially periodically opened by said rotor past said gas seal means to said intake port as said rotor planetates, an exhaust port located in one of said housing walls so that said working chambers are sequentially periodically opened by said rotor past said gas seal means to said exhaust port as said rotor planetates, recesses in one of said rotor sides radially outward of said side seals and extending intermediate said peripheral faces, a spark plug spark access hole smaller in area than the ends of said corner seals located adjacent said peripheral wall in one of said side walls opposite one side of said rotor in a position so that as said rotor planetates said spark access hole is periodically opened to said working chambers by said recesses and is also periodically traversed and completely closed by said one rotor side at the corners thereof cooperating with said corner seals on said one rotor side to thereby prevent leakage between adjacent working chambers through said spark access hole as said apex seals pass said spark access hole.

* * * * *